3,813,342
CLEANING COMPOSITIONS

Isadore Nathan Cooperman, 62 Farms Road, Freehold Township, Monmouth County, N.J. 07728
No Drawing. Continuation-in-part of abandoned application Ser. No. 43,170, June 30, 1970, which is a continuation-in-part of application Ser. No. 770,087, Oct. 23, 1968, now Patent No. 3,532,599. This application June 20, 1972, Ser. No. 264,425
Int. Cl. C11d 7/42
U.S. Cl. 252—170                                                12 Claims

ABSTRACT OF THE DISCLOSURE

A composition suitable for cleaning printing equipment having accumulated gum deposits comprising at least one enzyme selected from the group consisting of diastase, an esterase, a pentosanase-hexosanase, a protease or a cellulase and an organic solvent capable of dissolving printing ink, said composition containing at least about 0.1 percent by weight of the enzyme.

CLEANING COMPOSITIONS

This application is a continuation-in-part of copending application Ser. No. 43,170, now abandoned, which in turn is a continuation-in-part of Ser. No. 770,087, filed Oct. 23, 1968, now U.S. Pat. 3,532,599.

This invention relates to cleaning compositions useful in printing processes whereby equipment can be maintained in a like-new clean condition for extended periods of time. It relates further to enzymatic compositions for cleaning printing equipment whereby accumulated ink deposits can be effectively removed without damage to the surfaces on which the deposits are found.

Printing inks are generally full-bodied liquids which tenaciously adhere to paper, metal, textile, rubber, plastic and wood surfaces which they contact. These surfaces may be those upon which an image is printed or the surfaces on the parts of printing equipment. The tenacious adherence of ink to surfaces other than those receiving the imprint poses a problem in the care and maintenance of equipment especially metal and/or rubber rollers and metal and/or rubber printing plates. The ink deposits tend to build up and harden on surfaces which are required to meet close tolerance limits, and the eventual large accumulations can lead to a loss of usefulness of printing plates or rubber covered roller applicators. Cleaning procedures to minimize unwanted accumulation of ink residues fall into two categories and it is standard operating procedure to clean equipment by either one or both methods after each printing run or at the end of each day of operation.

One method commonly used is to wash with solvents and/or dilute acids. Dilute acids are used in cleaning metal printing plates, and, in the process of removing hardened deposits, the acid also etches the metal and weakens the plate, eventually causing it to be discarded. Solvent washes with alcohol and/or hydrocarbons remove greasy elements of the ink without attacking metal parts; however, organic solvents have a damaging effect on rubber and moreover they do not remove glazing which always forms on the rubber and/or metal surfaces on contact with printing inks.

The other method of cleaning printing equipment is to abrade the surfaces with a material such as finely ground pumice or other abrasive material. Abrasion can be used to clean both metal and rubber parts, and it is an effective approach in that the treated surfaces can be thoroughly cleaned by sufficient abrasion.

By using a combination of these methods, parts can be freed of solvent soluble and insoluble deposits. Generally parts are first washed in a solvent, e.g., a mixture of butanol and aliphatic distillate to remove excess ink. Washing of rubber parts must be carefully and quickly done since the solvent tends to penetrate into the rubber causing it to swell out of shape and lose its ability to adsorb ink efficiently. The washed parts can be further cleaned by careful abrasion with pumice or pumice-like compounds to remove insoluble glazing resulting from the hardening of gum constituents in many printing inks. The washed and abraded parts are in condition for further use provided these operations were carefully performed and not too often repeated. When a printing plate or a roller is abraded unevenly during cleaning, the unevenness and imbalance interferes with the quality of the copy, the uniformity of ink applications and/or the smoothness of press operation. Thus, though it is effective for the purpose, the abrading method is not fully satisfactory because it reduces the life of the equipment and can, if improperly done, reduce the quality of the printed image. Accordingly, there is a need in the printing industry for a safe and effective means of cleaning used printing equipment, especially rubber parts, to remove deposits which tend to impair the usefulness and reduce the life of the parts. It is a further object of this invention to provide new compositions which are useful for cleaning printing equipment in a manner which is both efficient and harmless to equipment.

In accordance with the present invention, these and other objects are accomplished in a surprisingly simple and effective manner by the use of enzymatically active cleaning compositions which are capable of decomposing the water and oil insoluble deposits which accumulate on the equipment normally in contact with printing ink. The enzyme attacks and decomposes, probably by hydrolysis, the hardened gum constituents which have deposited on the surfaces of the rollers and printing plates in much the same way as an acid would, except that the enzyme is completely harmless to metal and rubber surfaces whereas acid is not. The enzyme treatment removes, in addition to gum deposits, other components of the ink which had been occluded by the hardened gum.

The present invention is thus useful for cleaning equipment used in procedures where gums are employed in making the imprint. The gum can be a viscosity imparting constituent of the ink or, as in lithography, a part of the solution used to wet the printing plate. Printing inks, commonly having a gum component, are those used in lithographic, flexographic, rotogravure and letter press processes. Gums which are typically used for this purpose are gum arabic, gum tragacanth, guar gum, starch, alginate and methylcellulose.

The cleaning processes of this invention fill an especially important role in the case of lithographic and flexographic equipment since gum solutions are applied to the equipment all through the printing operation to impart required adsorbency characteristics to the printing plate or the offset blankets (rolls). Here, in view of the major amounts of gums which are employed, the problem of gum deposits is particularly frequent and troublesome.

Flexographic printing embraces multilith and collotype procedures in which printing is effected by water base ink transfer to and/or from a rubber or plastic plate for flexographic procedures or to and/or from a gelatin surface for collotype procedures. Gums are used to increase adhesion, impart better transference by increasing viscosity, improve fluid flow of the ink, and increase wettability of surfaces. Most commonly employed for this purpose is zein, a proteinaceous gum extracted from corn. Other gums such as gelatin, casein, starch, or soya protein have been suggested as substitutes for zein.

In lithography, gum solutions are used as an integral part of the printing process to form a grease repelling coating on the non-printing areas of the printing plate. The areas to which the gum coating does not adhere, are able to absorb the greasy ink and form the imprint. In offset lithography, the printing plate (normally in the form of a cylinder, called the "plate cylinder"), contacts a rubber covered cylinder (called the "blanket cylinder") which in turn makes the imprint by contacting the paper, metal, wood, plastic, or textile which is to be imprinted. The gum solution, normally buffered to an acid pH is applied to the printing plate by means of a series of "moistening rollers" which transfer the solution from a trough containing it. Each of the moistening rollers eventually builds up a glaze coat which interferes with the resiliency and adsorption efficiency of the rollers. In time, gum is transferred by water-in-oil emulsification to the inking rollers, and these likewise lose their essential properties. The gum which is most commonly employed in commercial lithographic operations is gum arabic; a polysaccharide extracted from acacia. Cellulose gum, a synthetic cellulose derivative, is also finding use in commercial operation. Other natural and synthetic gums are also sometimes used, but less frequently.

The choice of enzyme for any given application depends upon the chemical nature of the gum contained in the ink or in the moistening solution (as in the case of lithographic processes). Gums in use today are polysaccharides, cellulose derivatives or proteins. Thus, gum arabic is a polysaccharide, cellulose gum is a cellulosic derivative and zein is a protein. Polysaccharides are decomposed by diastatic and pentosanasic-hexosanasic enzymes. Celluloses are decomposed by cellulases or esterases such as lipases, pectinases and the like. Proteins are decomposed by proteolytic enzymes. The source of the enzymes used in the present invention is not of critical importance and any of the commercially available materials may be employed therein. In general the enzymatic materials are obtained by the fermentation of various mature seed spores or bacteria on a suitable culture medium. Classic methods for the propagation of these spores or bacteria and the extraction of the enzymatic material are outlined in microbiological textbooks and in U.S. Pat. No. 1,660,458, issued Feb. 28, 1928; U.S. Pat. No. 1,421,613, issued July 4, 1922, etc. Very useful enzymatic materials are offered commercially by Rohm and Haas. Rhozyme® HP–150 is a pentosanasic-hexosanasic enzyme which is useful for hydrolysis of polysaccharides such as gum arabic. Cellulase 26 is a cellulase which is useful for the hydrolysis of cellulose gum. Esterases such as lipases, pectinases and the like, because of their activity against cellulosic derivatives, are also useful in the hydrolysis of cellulose gums. Proteinaceous gums such as zein are hydrolyzed by proteolytic enzymes such as Rhozyme® A–4, Rhozyme® J–25, etc. Enzymatic materials are commercially available with or without diluents such as kaolin, salt or other inert materials. Though food grade enzyme products can be used, the present invention can be carried out more economically when technical grade enzymes are employed.

To practice the present invention, it is generally desirable to first remove excess printing ink and unhardened material from the part to be cleaned. In the case of greasy printing inks this can be accomplished by conventional solvent washes. The partially cleaned printing part is then immersed in a solution of the enzyme. Generally, the aqueous enzymatic solution is buffered to an acid or basic pH to provide an optimum environment in which the enzyme is active. Therefore, the choice of buffer is governed by the particular enzyme employed. The enzyme treatment can be conducted at room temperature or slightly higher, e.g. up to about 40 or 50° C. Enzymatic action begins as soon as the printing equipment is contacted with the enzyme composition. Generally, noticeable cleaning is effected after only several minutes of immersion. Longer immersion in the enzyme solution results in more thorough cleaning. There is no difficulty with allowing the printing part to be immersed in the enzyme solution for a prolonged period since the latter is harmless to either metal or rubber. The concentration of the enzyme in the cleaning solution may vary over wide limits. Generally, cleaning solutions with a concentration of from about 0.1 to about 30.0 parts of enzyme per 100 parts of cleaning solution are able to provide sufficiently rapid cleaning action while involving economically feasible amounts of the enzymatic material. Larger amounts (e.g. up to 75% or more) of enzyme may be used without danger to equipment but the advantage of reduced cleaning time may not justify the cost of the excess enzyme.

The compositions of the present invention can include any inert inorganic diluent (for example, as a suspending agent) which does not deactivate the active enzyme component. Among such diluents are diatomaceous earth, kaolin, clay, salt, silica, talc, hydrous magnesium-aluminum silicates and their organic derivatives; and acid buffers such as citrate, tartrate or acetate or basic buffers such as diammonium phosphate, sodium polyphosphate, etc. Generally, since some enzymes are active under acidic conditions, and others under basic conditions, it is desirable to include one of the abovementioned acid or basic buffers in the compositions of the present invention depending upon the particular enzyme employed. It is an advantage of this invention that the enzymatic material is not deactivated by organic solvents which are capable of dissolving the greasy components of ink. This compatibility permits the formulation of the enzymatic material as a dual function composition capable of exerting both hydrolytic and solvent action. Thus, it is possible to prepare a composition of the proteolytic, diastatic, pentosanasichexosanasic, or esterasic, e.g., lipasic, pectinasic, etc. enzyme, or combinations thereof in ink-solubilizing organic solvents such as the aromatic hydrocarbons (e.g., benzene, toluene, or xylene); the aliphatic hydrocarbons (e.g., those boiling in the range of about 100°–500° F. such as naphtha, hexene, hexane, heptane and octane); alcohols, for example, methanol, ethanol, hexanol and octanol; alkyl carboxylates, e.g., acetates such as ethyl acetate, ethoxyethyl acetate, butylacetate, amyl acetate, 2-ethoxy-ethanol-1 acetate (="Cellosolve" acetate); ethers such as dioxane and tetrahydrofuran; glycolethers such as ethylene glycol mono(lower-alkyl) ethers, e.g., the methyl, ethyl and butyl ethers; chlorinated hydrocarbons such as monochlorobenzene, carbon tetrachloride, ethylene dichloride or combinations of these solvents. The concentration of the enzyme in the organic solvent should generally be in the range of from about 0.1 to about 30 weight percent.

The composition can contain from about 0.1 to about 15 percent of one or more emulsifiers which will allow the organic solvent to mix with water when water is added to activate the enzyme. Non-ionic and ionic, oil-in-water and water-in-oil emulsifiers are useful. Among the non-ionic emulsifiers are oxyethylated glycols and triols. Among the useful ionic emulsifiers are higher fatty acid soaps such as the salts (especially the ammonium and amine salts) of oleic, palmitic, stearic, lanoleic and lanolin (especially polyethoxylated derivatives) acids. Salts of oil soluble fatty acids with volatile amines are particularly preferred emulsifiers and particularly preferred because they serve an important dual function. These salts, in addition to forming emulsions, as indicated, help to clean the printing roller with an oily material after the fugitive ammonium or amine cation has vaporized into the atmosphere. The oily material helps to soften the oil soluble inks adhering to the roller and precondition the roller so that it is highly adherent to ink as compared to one not having been treated by such an oily residue. The resulting emulsion will be found to be effective for removing glaze and also oil-soluble ink components from the printing equipment to be cleaned.

The cleaning compositions of the present invention can be applied to the equipment to be cleaned without disassembling it. Thus, for example, if it is desired to clean the moistening rollers in lithographic equipment the trough in which the moistening solution is generally kept can be emptied and the enzymatic composition of the present invention placed therein. By rotating the rollers in the trough containing the enzymatically active cleaning solution, the rollers are constantly brought into contact with the cleaning solution and after a suitable period of time become clean. Alternatively, a cloth can be dampened with the enzymatic cleaning material and used to apply it to the part to be cleaned. After a suitable period of time the enzymatic material can be removed by washing with water or solvent. The cleaned part will be notably free of glaze and any other material which may have been occluded by the glaze forming substance. The cleaned part can be returned to service without any further treatment.

A typical composition for cleaning lithographic printing plates or rubber rollers has the following formulation:

| | Parts |
|---|---|
| Rhozyme® HP-150 enzyme | 10 |
| Water | 90 |

If it is desired, a lithographic cleaning solution can be prepared to contain both enzymatically active material and organic solvent. An example of such a composition is:

| | Parts |
|---|---|
| Rhozyme® HP-150 enzyme | 10 |
| Laktane® solvent | 60 |
| Ethanol | 40 |

A useful composition for cleaning flexographic equipment has the following composition:

| | Parts |
|---|---|
| Rhozyme® A-40 enzyme | } 15 |
| Rhozyme® J-25 enzyme | |
| Ethyl acetate | 25 |
| Laktane® solvent | 75 |

The following examples are presented to further illustrate the present invention. Unless otherwise stated, all percentages and parts are by weight.

EXAMPLE 1

A rubber roller which had been used for about 900 days for moistening lithographic printing plates was cleaned of excess liquids and presented a glazed, black appearance. This roller was subjected to the following treatment.

A cleaning solution comprising Rhozyme® HP-150 enzyme (10 parts) and water (90 parts) is applied to a roller and the machine is operated. As the roller turns in contact with other rollers the cleaning solution is distributed over the roller surface and after a few minutes the color of the roller gradually begins to change. Solvent wash then causes the roller color to change from black to green (the original color of the rubber roller) and considerable softening of the roller is noted. Previous cleaning of the roller with organic solvents only had left the roller in a hardened and black condition.

EXAMPLE 2

Employing the procedure set forth in Example 1, a cleaning solution comprising 10 parts Rhozyme® HP-150 enzyme, 60 parts Laktane® solvent (an aliphatic naphtha having a boiling point of 214° F. and a specific gravity of 0.7690, manufactured by Humble Oil Company), 40 parts ethanol, 40 parts water, 2 parts emulsifier and 4 parts ammonium hydroxide is applied to a roller and the machine operated. After solvent wash, the original color of the rubber roller reappears and considerable softening of the roller is noted.

EXAMPLE 3

A formulation which not only cleans printing rollers, but also preconditions the roller surface to impart ink receptivity to them is as follows:

| | Parts by wt. | Range (wt. percent) |
|---|---|---|
| Mix A (emmolients and cleaning agents not antagonistic to enzyme) | | |
| Varsol 1 or Varsol 4 | 50 | 20-80 |
| Cellosolve acetate | 15 | 5-25 |
| Solulan C-24 [1] | 3 | 1-5 |
| Solulan C-5 [1] | 2 | 1-5 |
| Oleic acid (Emersol 233) | 4 | 0.5-3 |
| Mix B (water, enzyme base) | | |
| Water (distilled or deionized) | 21 | |
| RHOZYME HP-150 (concentrate) | 0.1 | 0.1-30.0 |
| NH₄OH | 2.0 | } 0.1-10.0 |
| Morpholine [2] | 2.0 | |
| Total | 100.00 | |

[1] Solulan C-24 and Solulan-5 are ethoxylated lanolin fatty acid derivatives manufactured by Chemactant Inc., Edison, New Jersey.
[2] Or all NH₄OH.

The oleic acid is oil soluble but with $NH_4OH$ it forms a soap which aids in emulsifying the water solution of enzyme. When the mixture of A is poured into B with rapid stirring an emulsion is formed which may settle on long standing but which is easily reformed by shaking.

In use, the emulsion is spread out on the rollers and the $NH_4OH$, being fugitive, is released, freeing the oleic acid which together with the Solulan derivatives cleanse the oil soluble ink components from the rollers. The ammonia also helps to solubilize the enzyme and activates it at the same time. This formulation has cleaned rollers so well that a black ink can be run before a yellow ink with only one wash-up and no tinting of the yellow. Also, 30% less ink is required after treatment, less ink fountain adjustment is necessary, no glaze build-up is noted and cleanup time is reduced. The specific proportions were chosen for purposes of economy and to obtain a cleaner with good cleaning capability. Cellosolve acetate was used to give a highly active solvent. The Varsol 1 and Varsol 4 are approved ASTM Lithographic cleaner solvents that act as excellent vehicles for creating the cleaner (they also have a high flash point and low toxicity). Varsol 4 is preferred because of its slower drying speed, giving the cleaner a longer time to act. If faster dry-up is desired, Varsol 1 can be used.

A diatomaceous earth such as Cav-O-Sil M-5 (a hydrated silica) which gives good emulsion stabilization and may even give some absorption cleaning, the innocous powder residue remaining after drying may be considered by some as undesirable, so this material can be eliminated.

One great advantage of this cleaner, is its lack of flammability. When a lighted match is placed in a capful of emulsion, it is extinguished.

I claim:
1. A composition suitable for cleaning printing equipment having accumulated gum deposits consisting essentially of at least one enzyme selected from the group consisting of diastase, an esterase, a pentosanase-hexosanase, a protease or a cellulase and an organic solvent capable of dissolving printing ink, said composition containing at least about 0.1 percent by weight of the enzyme.

2. The composition of claim 1 containing from about 0.1 to about 30 weight percent of the enzyme.

3. The composition of claim 1 additionally containing from about 0.1 to about 15 percent of at least one ionic or non-ionic emulsifier.

4. The composition of claim 1 additionally containing a sufficient amount of inert inorganic diluent to aid in suspending the enzyme in the solvent system.

5. The composition of claim 1 additionally containing sufficient acidic or basic buffer to activate the enzyme.

6. The composition of claim 1 additionally containing sufficient water to effect activation of the enzyme and form an emulsion.

7. The composition of claim 1 wherein the solvent is an aliphatic hydrocarbon.

8. The composition of claim 1 wherein the solvent is a glycol ether acetate.

9. The composition of claim 3 wherein the emulsifier is an ethoxylated lanolin fatty acid.

10. The composition of claim 1 wherein the emulsifier is a high fatty acid salt of ammonia or an amine.

11. The composition of claim 10 containing 0.5 to 3% of an ammonia or amine salt of a higher fatty acid.

12. The composition of claim 11 containing 1 to 5% of an ethoxylated lanolin fatty acid salt of ammonia or an amine.

References Cited

UNITED STATES PATENTS

| | | | |
|---|---|---|---|
| 2,780,168 | 2/1957 | Nichols | 101—149 A |
| 2,862,444 | 12/1958 | Drautz | 101—149.4 |
| 2,152,520 | 3/1939 | Lind | 252—DIG 12 |
| 2,343,136 | 2/1944 | Dobson et al. | 252—DIG 12 |
| 2,922,749 | 1/1960 | Snyder et al. | 252—DIG 12 |
| 3,060,848 | 10/1962 | Beutner | 101—149.2 |
| 3,519,570 | 7/1970 | McCarty | 252—DIG 12 |

WILLIAM E. SCHULZ, Primary Examiner

U.S. Cl. X.R.

195—63; 252—171, DIG 12